United States Patent
Yamada et al.

(10) Patent No.: US 7,764,666 B2
(45) Date of Patent: Jul. 27, 2010

(54) VOIP GATEWAY APPARATUS, AND METHOD FOR CONTROLLING CALL-IN/CALL-OUT IN VOIP GATEWAY APPARATUS

(75) Inventors: Noboru Yamada, Fukushima-ken (JP); Kazumasa Azuma, Fukushima-ken (JP); Kazuhiro Okamoto, Fukushima-ken (JP)

(73) Assignee: Hitachi, Ltd., Tokyo (JP)

( * ) Notice: Subject to any disclaimer, the term of this patent is extended or adjusted under 35 U.S.C. 154(b) by 758 days.

(21) Appl. No.: 10/582,663

(22) PCT Filed: Dec. 17, 2004

(86) PCT No.: PCT/JP2004/018899

§ 371 (c)(1), (2), (4) Date: Apr. 11, 2007

(87) PCT Pub. No.: WO2005/060226

PCT Pub. Date: Jun. 30, 2005

(65) Prior Publication Data

US 2007/0201493 A1 Aug. 30, 2007

(30) Foreign Application Priority Data

Dec. 18, 2003 (JP) .............................. 2003-421080

(51) Int. Cl.
H04R 25/00 (2006.01)
(52) U.S. Cl. ...................................... 370/352; 370/356
(58) Field of Classification Search ......... 370/352–356, 370/466; 379/90.01, 93.01
See application file for complete search history.

(56) References Cited

U.S. PATENT DOCUMENTS

| 5,062,103 | A | 10/1991 | Davidson et al. |
| 6,252,869 | B1 * | 6/2001 | Silverman .................... 370/352 |
| 6,968,367 | B1 * | 11/2005 | Vassar et al. ................. 709/219 |
| 6,996,094 | B2 * | 2/2006 | Cave et al. ................... 370/356 |

(Continued)

FOREIGN PATENT DOCUMENTS

JP 02-265345 10/1990

(Continued)

Primary Examiner—Suhan Ni
(74) Attorney, Agent, or Firm—Antonelli, Terry, Stout & Kraus, LLP.

(57) ABSTRACT

A VoIP gateway apparatus is used to provide an IP centrex service to accommodated devices. The VoIP gateway apparatus (1) assigns, to a call originated from an accommodated device (PBX 2), a telephone number for which the number of simultaneous call connections has not reached a simultaneous connection tolerance number, and sends the call to an IP centrex network (5) with the assigned telephone number used as a calling number. The VoIP gateway apparatus (1) includes a number-of-calls management part (105) and a SIP processing part (104). The number-of-calls management part (105) manages the number of the current simultaneous call connections for each of the telephone numbers as assigned to the apparatus. When a call is received from an accommodated device, a SIP processing part (104) selects, among the telephone numbers as assigned to the apparatus, a telephone number, for which the number of the current simultaneous call connections as managed by the number-of-calls management part (105) is smaller than the predetermined simultaneous connection tolerance number, and then transmits, to the IP centrex network (5), a SIP packet of a call control message to which the selected telephone number has been added as the calling number.

4 Claims, 8 Drawing Sheets

U.S. PATENT DOCUMENTS

2001/0032270 A1  10/2001  Koo
2004/0208167 A1  10/2004  Kishida

FOREIGN PATENT DOCUMENTS

| | | |
|---|---|---|
| JP | 11-164018 | 6/1999 |
| JP | 11-331371 | 11/1999 |
| JP | 2000-050357 | 2/2000 |
| JP | 2001-313676 | 11/2001 |
| JP | 2002-171293 | 6/2002 |
| JP | 2003-209621 | 7/2003 |
| JP | 2003-258916 | 9/2003 |
| JP | 2003-298660 | 10/2003 |
| WO | WO 02/100083 | 12/2002 |

* cited by examiner

VoIP GATEWAY APPARATUS 1

ADDRESS CONVERSION TL 107

| TELEPHONE NUMBER | IP ADDRESS |
| --- | --- |
| 5000 | 162.123.123.100 |
| 5001 | 162.123.123.100 |
| 5002 | 162.123.123.100 |
| 4000 | 162.123.123.110 |
| 4001 | 162.123.123.110 |
| 4002 | 162.123.123.110 |
| 3000 | 162.123.123.110 |
| 3001 | 162.123.123.110 |
| 3002 | 162.123.123.110 |
| 3003 | 162.123.123.110 |

FIG. 4

NUMBER-OF-CALLS MANAGEMENT TL 106

| TELEPHONE NUMBER 1061 | SIMULTANEOUS CONNECTION TOLERANCE NUMBER 1062 | CURRENT SIMULTANEOUS NUMBER-OF-CALLS 1063 | CALL-OUT SIMULTANEOUS CONNECTION TOLERANCE NUMBER 1064 | CURRENT CALL-OUT SIMULTANEOUS CONNECTION NUMBER 1065 |
|---|---|---|---|---|
| 5000 | 3 | 1 | 1 | 0 |
| 5001 | 5 | 2 | 2 | 1 |
| 5002 | 5 | 2 | 2 | 2 |

FIG. 5

CALL-OUT MANAGEMENT TL 108

| CALLING NUMBER 1081 | CHANNEL 1082 | SPEECH PARTNER 1083 |
|---|---|---|
| 5000 |  | *.*.* |
| 5000 |  | *.*.* |
| 5001 |  | *.*.* |

CALL-IN/CALL-OUT CONTROLLING PROCEDURE

CALL-IN/CALL-OUT CONTROLLING PROCEDURE

VOIP GATEWAY APPARATUS, AND METHOD FOR CONTROLLING CALL-IN/CALL-OUT IN VOIP GATEWAY APPARATUS

TECHNICAL FIELD

The present invention relates to a VoIP gateway apparatus to be used for communications using VoIP (Voice over Internet Protocol) and, more particularly, to a call-in/call-out (incoming call/outgoing call) control method in the VoIP gateway apparatus.

BACKGROUND ART

As an apparatus for realizing VoIP communications using an existing PBX (Private Branch Exchange) or telephone terminal, there is known a VoIP gateway apparatus for converting a communication signal or a control signal into an IP packet thereby to send out the IP packet to an IP network side and for restoring the communication signal or the control signal from the IP packet received from the IP network side thereby to send out that signal to the PBX or telephone terminal. This VoIP gateway apparatus is described in Patent Document 1, for example.

Patent Document 1: JP-A-2003-298660

DISCLOSURE OF THE INVENTION

Problems to be Solved by the Invention

In recent years, there has been started an IP centrex service for providing a PBX function through an IP network. In the IP centrex service, a telephone number for receiving that service is added to each IP telephone terminal. When a call-out is made, the IP telephone terminal transmits the call, accompanied by a telephone number assigned thereto, to an IP centrex network (an IP centrex server) for the IP network centrex service. In response to this, the IP centrex network confirms, on the basis of the telephone number of the call-out IP telephone terminal, that the IP telephone terminal can receive the IP centrex service, and transmits a call to a communication partner. Thus, the PBX function is provided through the IP network. In the IP centrex service, moreover, a plurality of calls can be simultaneously connected with one telephone number.

Here, the VoIP gateway apparatus described in Patent Document 1 has failed to take this IP centrex service into consideration. That is, the VoIP gateway apparatus does not take into consideration the provision of the IP centrex service to an accommodated device (e.g., the existing PBX or telephone terminal) connected to the VoIP gateway apparatus.

The present invention has been conceived in view of the background thus far described, and has as an object the provision of an IP centrex service to an accommodated device by using a VoIP gateway apparatus. Specifically, an object is to make it possible that the accommodated device receives an IP centrex service without assigning a telephone number for receiving the IP centrex service, in advance to the accommodated device.

Means For Solving The Problems

In order to solve the aforementioned problems, the VoIP gateway apparatus of the invention assigns a telephone number for which the number of simultaneous connection calls has not reached a simultaneous connection allowance number, to a call originated from an accommodated device (a PBX or a telephone terminal), and sends the call to an IP network with the assigned telephone number as a calling number.

According to the invention, for example, a VoIP gateway apparatus connecting an accommodated device with an IP network, the apparatus comprising: management means for managing the current number of simultaneous connection calls using at least one telephone number respectively assigned to the VoIP gateway apparatus itself; and call control means for selecting, in cases in which a call is received from the accommodated device, among the at least one telephone number, a telephone number, for which the current number of simultaneous connection calls as managed by the management means is smaller than a predetermined simultaneous connection allowance number, and for transmitting, to the IP network, a call control message to which the selected telephone number has been added as a calling number.

ADVANTAGES OF THE INVENTION

In the invention, a telephone number is automatically assigned to a call coming from an accommodated device, and a call control message in response to the call is sent out with the assigned telephone number as a calling number. According to the invention, therefore, it is possible to provide an IP centrex service to the accommodated device or an existing PBX or telephone terminal.

BRIEF DESCRIPTION OF THE DRAWINGS

FIG. 4 is a diagram showing one example of a number-of-calls management TL 106;

FIG. 5 is a diagram showing one example of a call-out management TL 108;

DESCRIPTION OF REFERENCE SYMBOLS

1 ... VoIP Gateway Apparatus, 2 ... PBX, 3 .... Extension Telephone Terminal, 5 ... IP Centrex Network, 4 ... PSTN, 101 .... Circuit IF Unit, 102 ... IP Network IF Unit, 103 ... RTP Processing Unit, 104 ... SIP Processing Unit, 105 .... Number-Of-Calls Management Unit, 106 .... Number-Of-Calls Management TL, 107 .... Address Conversion TL, and 108 .... Call-Out Management TL.

BEST MODE FOR CARRYING OUT THE INVENTION

An embodiment of the present invention is explained in the following.

Figure 1:
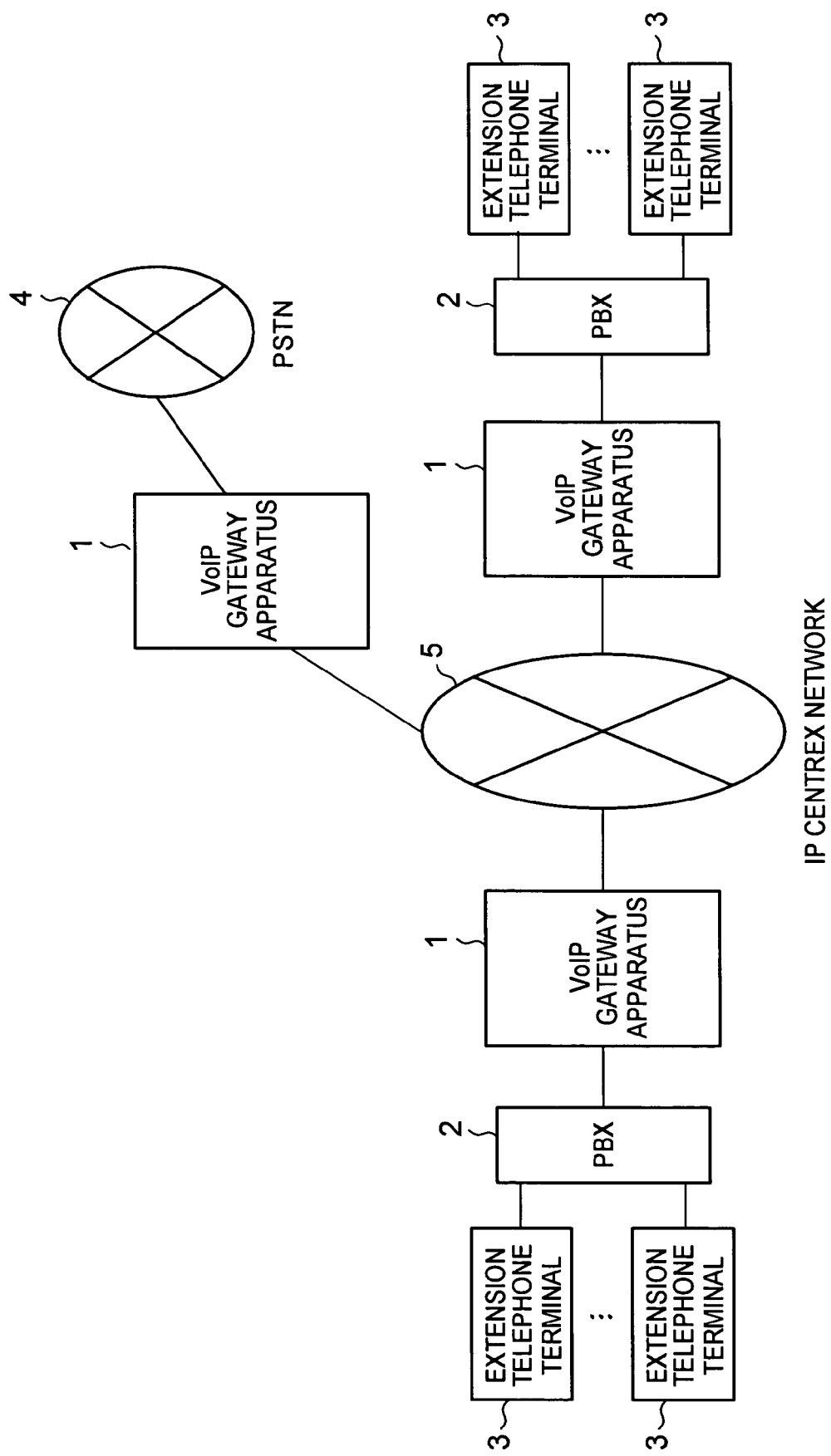
FIG. 1 is a schematic diagram of a VoIP communication system, to which one embodiment of the invention is applied.

FIG. 1 is a schematic diagram of a VoIP communication system, to which one embodiment of the invention is applied.

In FIG. 1: numeral 2 designates a PBX; numeral 3 an extension telephone terminal accommodated in the PBX 2; and numeral 4 a PSTN (Public Switched Telephone Network). Moreover, numeral 1 designates a VoIP gateway apparatus 1 according to one embodiment of the invention. This VoIP gateway apparatus 1 connects the PBX 2 or the PSTN 4 with an IP centrex network 5. To the VoIP gateway apparatus 1 of this embodiment, moreover, there is assigned at least one telephone number for receiving the IP centrex service provided by the IP centrex network 5.

The VoIP gateway apparatus 1 creates, when it receives a call from the PBX 2 or PSTN 4 (an accommodated device) housed therein, a call control message which is addressed to an IP address corresponding to a called number designated by that call. The VoIP gateway apparatus 1 gives, among the telephone numbers assigned to the apparatus, a telephone number, for which the current number of simultaneous connections calls is smaller than the simultaneous connection allowance number as permitted by the IP centrex service, as a calling number, to the created call control message, and transmits that telephone number to the IP centrex network 5. The IP centrex server (not illustrated) in the IP centrex network 5 receives the call control message as transmitted by the VoIP gateway apparatus 1, and confirms that the calling number as assigned to the call control message is a telephone number capable of receiving the IP centrex service. The IP centrex server then transmits the call control message received to the VoIP gateway apparatus 1 having the IP address designated as the address of that message. As a result, the IP centrex network 5 provides PBX functions. The VoIP gateway apparatus 1, having received the call control message, transmits, in cases in which the current number of simultaneous connection calls is smaller, for the telephone number designated as the called number by the call control message and assigned to the apparatus, than the simultaneous connection allowance number permitted by the IP centrex service, the call corresponding to that call control message, to the accommodated device.

The VoIP gateway apparatus 1 performs the call controlling procedure of the VoIP containing the exchange of the call control message thus far described, thereby establishing a call with a communication partner (an external VoIP gateway apparatus 1) through the IP centrex network 5. Moreover, transmission and reception of a communication signal is performed through that call. Specifically, the communication signal as sent from the accommodated device is converted into an IP packet, and this IP packet is transmitted to a communication partner through the IP centrex network 5. Furthermore, the communication signal is extracted from the IP packet as received from the communication partner through the IP centrex network 5, and is transmitted to the accommodated device.

Figures 2, 3:
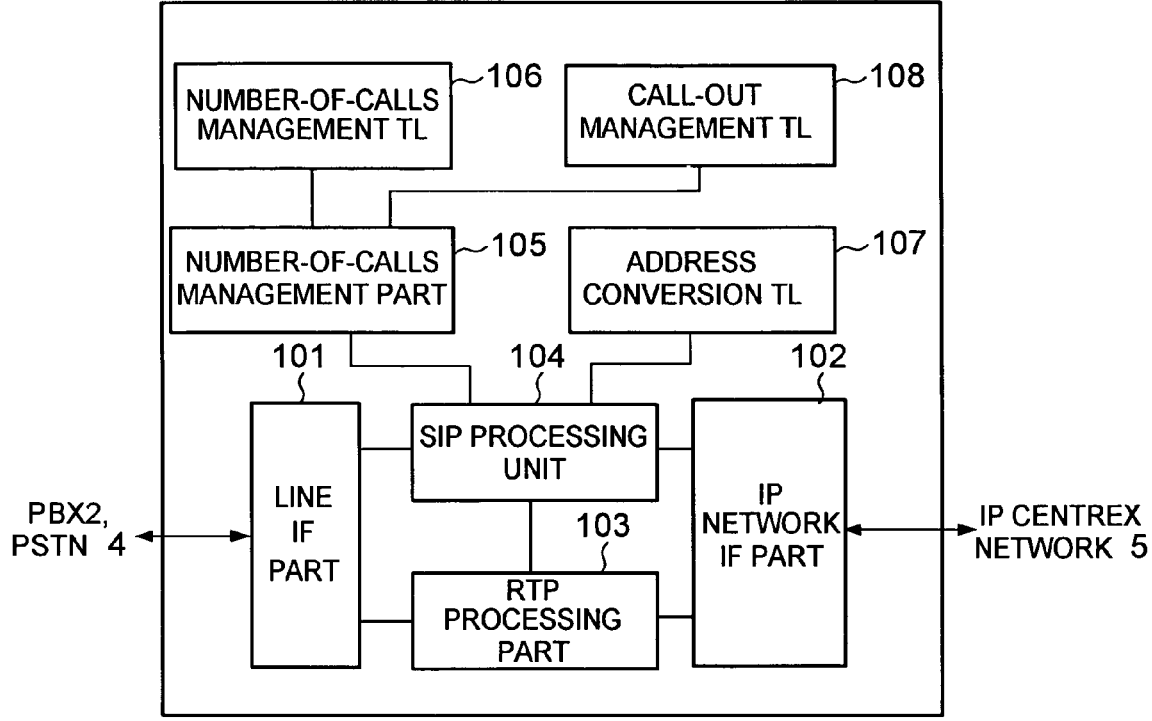
FIG. 2 is a schematic configuration diagram of a VoIP gateway apparatus 1.
FIG. 3 is a diagram showing one example of an address conversion TL 107.

FIG. 2 is a schematic configuration diagram of the VoIP gateway apparatus 1.

As shown, the VoIP gateway apparatus 1 of this embodiment includes a line IF (InterFace) unit 101, an IP network IF unit 102, an RTP processing unit 103, an SIP processing unit 104, a number-of-calls management unit 105, a number-of-calls management TL (Table) 106, an address conversion TL 107, and a number-of-calls management TL 108.

The line IF unit 101 exchanges a communication signal and a call control signal with the accommodated device, for example, through an ISDN primary rate interface line.

The IP network IF unit 102 exchanges the RTP (Real-time Transport Protocol) packet and the SIP (Session Initiation Protocol) packet with the IP centrex network 5, for example, through Ethernet (registered trademark).

The SIP processing unit 104 performs the call controlling procedure of the VoIP specified in the SIP, thereby establishing a call with the communication partner (the external VoIP gateway apparatus 1) and notifying the RTP processing unit 103 of the channel (e.g., the B-channel of the ISDN), as used for communication with the accommodated device assigned to that call by the line IF unit 101, and the IP address of the communication partner.

Specifically, in cases in which a call is received from the accommodated device through the line IF unit 101 (in cases in which the accommodated device is on the call-out side), a request for a calling number is notified to the number-of-calls management unit 105, and the calling number is acquired from the number-of-calls management unit 105. Moreover, the address conversion TL 107 is used to specify the IP address corresponding to the called number, as designated by the call. After that, an SIP packet of a connection request message, which is addressed (as the communication partner) to the IP address corresponding to the called number and for which the calling number and the called number are designated, is created and transferred to the IP network IF unit 102. After this, the call control message of the SIP packet, as received from the communication partner through the IP network IF unit 102, is analyzed, and the call control signal according to the analytical result is transferred to the line IF unit 101. Moreover, the SIP packet addressed to the communication partner of the call control message according to the call control signal received from the accommodated device through the line IF unit 101 is created and transferred to the IP network IF unit 102.

In cases in which the SIP packet of the connection request message is received from the communication partner through the IP network IF unit 102 (in cases in which the accommodated device is on the call-in side), the number-of-calls management unit 105 is notified of a connection permission request for the called number designated with that call control message. Moreover, the call control signal indicating the connection request is transferred, when the connection permission is acquired from the number-of-calls management unit 105, to the line IF unit 101. After this, the SIP packet of the call control message according to the call control signal, received through the accommodated device through the line IF unit 101, is created and transferred to the IP network IF unit 102. Moreover, the call control message of the SIP packet received from the communication partner through the IP network IF unit 102 is analyzed, and the call control signal according to the analytical result is transferred to the line IF unit 101.

The RTP processing unit 103 processes, according to the specifications of the RTP, the RTP packet of the communication partner, containing the communication signal received by the line IF unit 101 from the accommodated device through the channel notified by the SIP processing unit 104, and the IP address received by the IP network IF unit 102 and notified by the SIP processing unit 104.

Specifically, the communication signal, which has been received by the line IF unit 101 through the channel notified by the SIP processing unit 104, is converted into the RTP packet, and this RTP packet is transferred with the IP address notified by the SIP processing unit 104, to the IP network IF unit 102. Moreover, the communication signal is restored from the RTP packet, whose source is the IP address which has been received by the IP network IF unit 102 and notified by the SIP processing unit 104, and is transmitted through the line IF unit 101 to the channel notified by the SIP processing unit 104.

The address conversion TL 107 is registered, as shown in FIG. 3, with IP addresses 1072 individually corresponding to telephone numbers 1071. The SIP processing unit 104 specifies the IP addresses of the VoIP gateway apparatus 1 having the called number of the call issued from the accommodated device, with that address conversion TL 107.

The number-of-calls management unit 105 uses the number-of-calls management TL 106 and the call-out management TL 108 thereby to manage the number of simultaneous connection calls for each telephone number assigned to its own VoIP gateway apparatus 1. In cases in which the calling number request is accepted from the SIP processing unit 104, on the other hand, the number-of-calls management TL 106 is used to specify, among the telephone numbers assigned to its own VoIP gateway apparatus 1, the telephone number to be used for the call-out, and to notify that telephone number to the SIP processing unit 104. In cases, moreover, in which a connection permission request accompanied by the designation of a telephone number is accepted from the SIP processing unit 104, the number-of-calls management TL 106 is used to decide whether or not the designated telephone number can be used, and to notify the SIP processing part 104 of the connection permission if usage is possible.

As shown in FIG. 4, the number-of-calls management TL 106 is registered, in a corresponding manner for each telephone number 1061 assigned to its own VoIP gateway apparatus 1, with: a simultaneous connection allowance number 1062 that is the number of simultaneous connections allowed by the call IP centrex service using that telephone number; a current number of simultaneous connections 1063 that is the current number of simultaneous call connections using that telephone number; a call-out simultaneous connection allowance number 1064 that is the current number of connections allowed in the IP centrex service for the call-out (i.e., the call transmitted from the accommodated device) using that telephone number; and a current call-out simultaneous connection number 1065 that is the current simultaneous connection number of the call-out using that telephone number. Here, the simultaneous connection allowance number 1062 and the call-out simultaneous connection allowance number 1064 have values that are registered in advance by a manager or the like, whereas the current simultaneous connection number 1063 and the current call-out simultaneous connection number 1065 have values which are updated by the number-of-calls management unit 105.

As shown in FIG. 5, the call-out management TL 108 is registered for each call that has been established by a connection request transmitted from the accommodated device, with a telephone number 1081 assigned to that call as the calling number, a channel 1082 to be used for connecting that call to the accommodated device between the accommodated device and the line IF unit 101, and an IP address 1083 of the communication partner of that call. The call-out management TL 108 is updated by the number-of-calls management unit 105.

Figure 6:
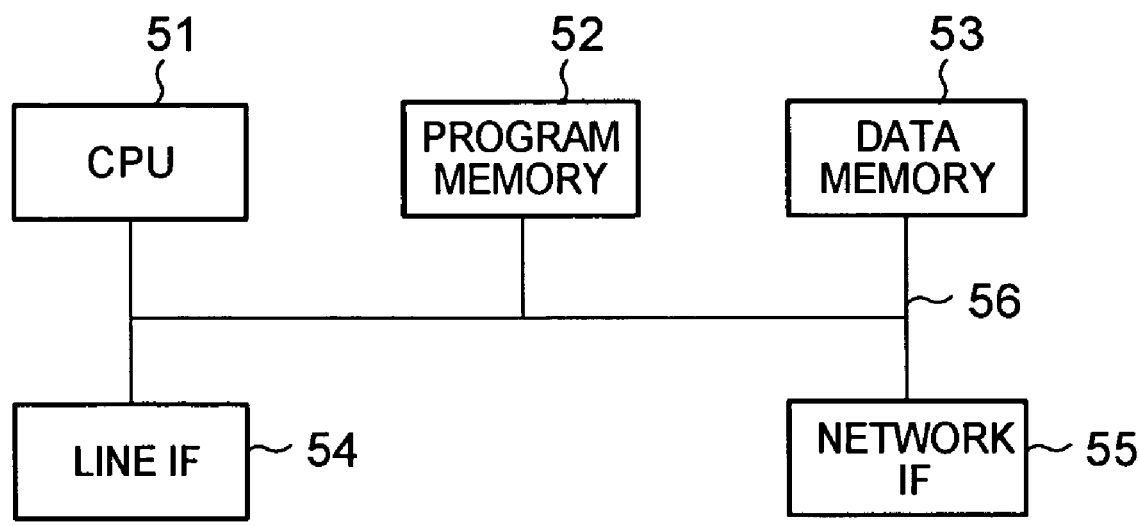
FIG. 6 is a diagram showing a hardware configuration example of the VoIP gateway apparatus 1.

The aforementioned VoIP gateway apparatus 1 is realized such that a CPU 51 executes a program stored in a program memory 52 in a computer system including: the CPU 51; the program memory 52 stored with the program; a data memory 53 stored with data; a line IF 54 connected with the ISDN primary rate interface line, for example, for communications with the accommodated device through that line; a network IF 55 connected with a LAN cable, for example, with the IP centrex network 5 through that cable; and an internal bus 56 for connecting those configuration components 51 to 55 with each other, as shown in FIG. 6. In this case: the data memory 53 is used as the number-of-calls management TL 106 and the address conversion TL 107; the line IF 54 is used as the line IF unit 101; and the network IF 55 is used as the IP network IF unit 102.

The actions of an IP telephone 10 thus configured are described in the following.

Figure 7:
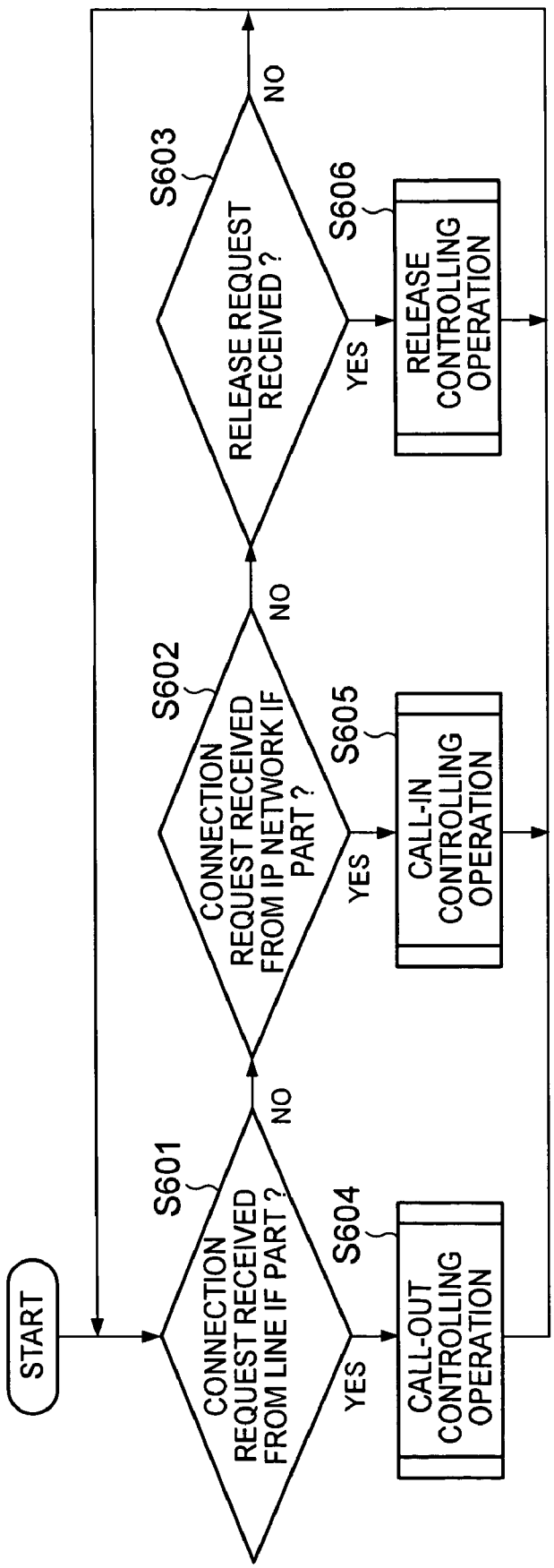
FIG. 7 is a flow chart explaining a call-in and call-out controlling procedure in the VoIP gateway apparatus 1.

FIG. 7 is a flow chart for explaining a call-in and call-out controlling procedure in the VoIP gateway apparatus 1.

When (Yes at S601) a connection request (call-out) is received from the accommodated device (PBX 2, PSTN 4) through the line IF unit 101, the SIP processing unit 104 performs a call-out controlling operation (S604) to be described hereinafter. If the connection request (call-in) is received (No at S601 and Yes at S602) from the IP centrex network 5 through the IP network IF unit 102, the later-described call-in controlling operation is performed (at S605). Alternatively, if the release request is received (No at S601 and S602 and Yes at S603) either from the accommodated device through the line IF unit 101 or from the IP centrex network 5 through the IP network IF unit 102, the later-described release controlling operation is performed (at S606).

Figure 8:
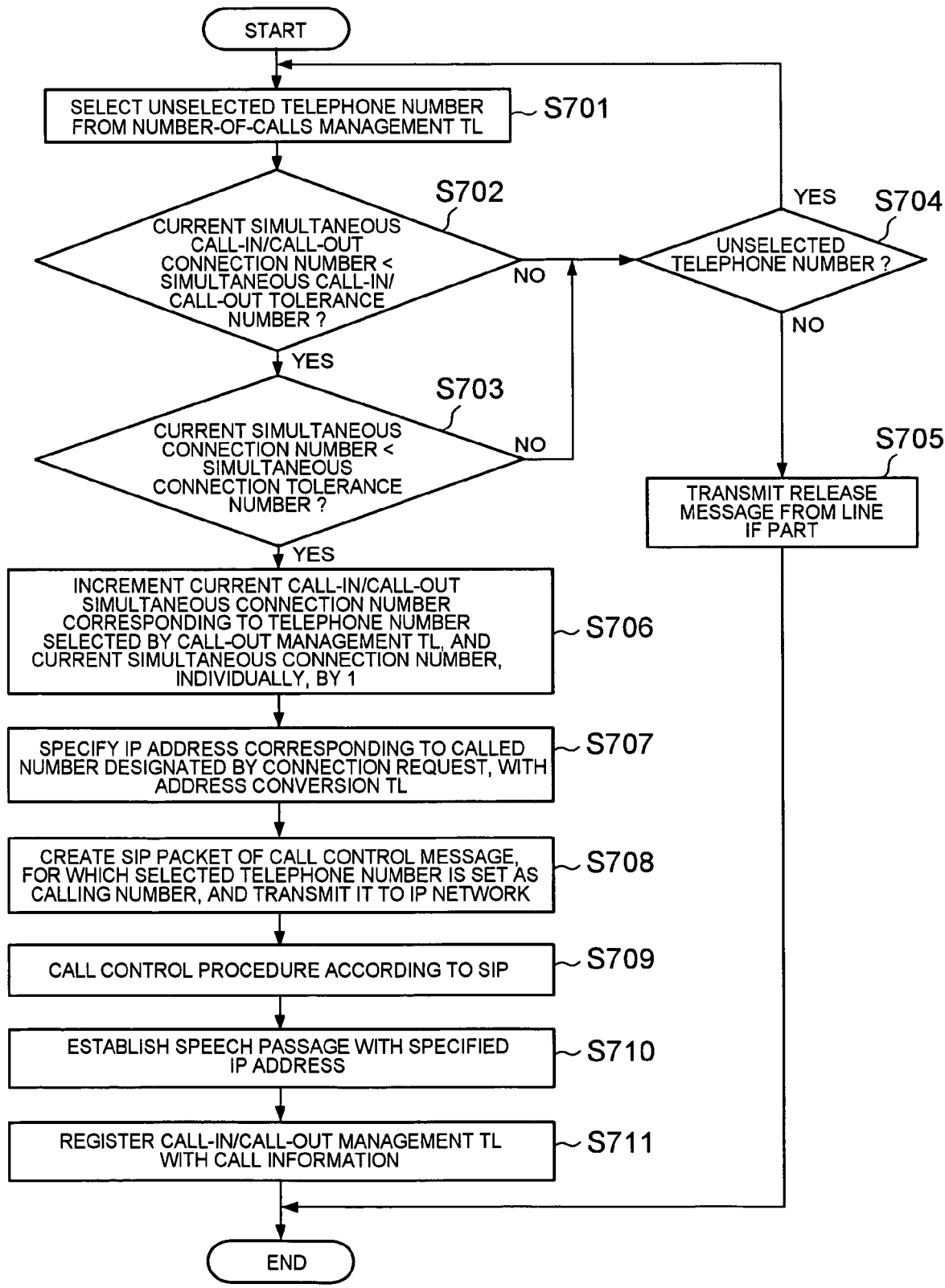
FIG. 8 is a flow chart explaining a call-out controlling operation (S604 of FIG. 7)

FIG. 8 is a flow chart for explaining a call-out controlling operation (S604 of FIG. 7).

At first, the SIP processing unit 104 transmits a calling number request to the number-of-calls management unit 105. In response to this, the number-of-calls management unit 105 selects an unselected telephone number (at S701) from the number-of-calls management TL 106. Then, the number-of-calls management TL 106 examines (at S702 and at S703) whether or not the current call-out simultaneous connection number corresponding to the selected telephone number is less than the call-out simultaneous connection allowance number corresponding to that telephone number, and whether or not the current simultaneous connection number corresponding to the selected telephone number is less than the simultaneous connection tolerance number corresponding to that telephone number.

In cases in which the current call-out simultaneous connection number corresponding to the selected telephone number is not (No at S702) less than the call-out simultaneous connection allowance number corresponding to that telephone number, or in cases in which the current simultaneous connection number corresponding to the selected telephone number is not (No at S703) less than the simultaneous connection allowance number corresponding to that telephone number, the number-of-calls management unit 105 returns to S701 if an unselected telephone number (Yes at S704) is in the number-of-calls management TL 106. If there is no unselected telephone number (No at S704), the number-of-calls management unit 105 notifies the SIP processing unit 104 that the calling number cannot be assigned. In response to this, the SIP processing unit 104 creates and transmits (at S705) the release message to the accommodated device through the line IF unit 101.

On the other hand, in cases in which the current call-out simultaneous connection number corresponding to the selected telephone number is less than the call-out simultaneous connection allowance number corresponding to that telephone number, and in cases in which the current simultaneous connection number corresponding to the selected telephone number is less than the simultaneous connection tolerance number corresponding to that telephone number (Yes at both S702 and S703), the number-of-calls management unit 105 increments by 1 (at S706) each of the current call-out simultaneous connection number and the current simultaneous connection number, which are registered in the number-of-calls management TL 106 so as to correspond to the selected telephone number. The selected telephone number is then notified as the calling number to the SIP processing unit 104.

The SIP processing unit 104 specifies (at S707), when it receives the notification of the calling number from the call-out management unit 105, the IP address corresponding to the called number designated by the connection request received from the accommodated device through the line IF unit 101, with the address conversion TL 107. The SIP packet of the connection request message, for which the calling number notified by the call-out management unit 105 and the called number designated with the connection request received from the accommodated device through the line IF unit 101 are designated, is then created and transmitted (at S708) with the IP address specified at S707 from the IP network IF unit 102 to the IP centrex network 5. After this, the SIP processing unit 104 performs a call controlling operation (at S709) according to the SIP with the communication partner having the IP address specified at S707, and establishes a call (at S710) with the communication partner.

The SIP processing unit 104 then makes a request to the line IF unit 101 for a channel assignment. In response to this, the line IF unit 101 sets a channel between the accommodated device to be assigned to the established call, and notifies the SIP processing unit 104 of the set channel. The SIP processing unit 104 notifies the RTP processing unit 103 of the channel notified by the line IF unit 101 and the IP address specified at S707. In response to this, the RTP processing unit 103 performs the processing specified at the RTP, on the communication signal received from the accommodated device through the channel notified to the line IF unit 101 from the SIP processing unit 104, and on the RTP packet of the communication partner, which is received by the IP network IF unit 102 and has the IP address notified by the SIP processing unit 104. As a result, communication can be made.

Next, the SIP processing unit 104 registers (at S711) in the call-out management TL 108 the records of the calling number notified by the number-of-calls management unit 105, the channel assigned to the call by the line IF unit 101 and the IP address of the communication partner.

Figure 9:
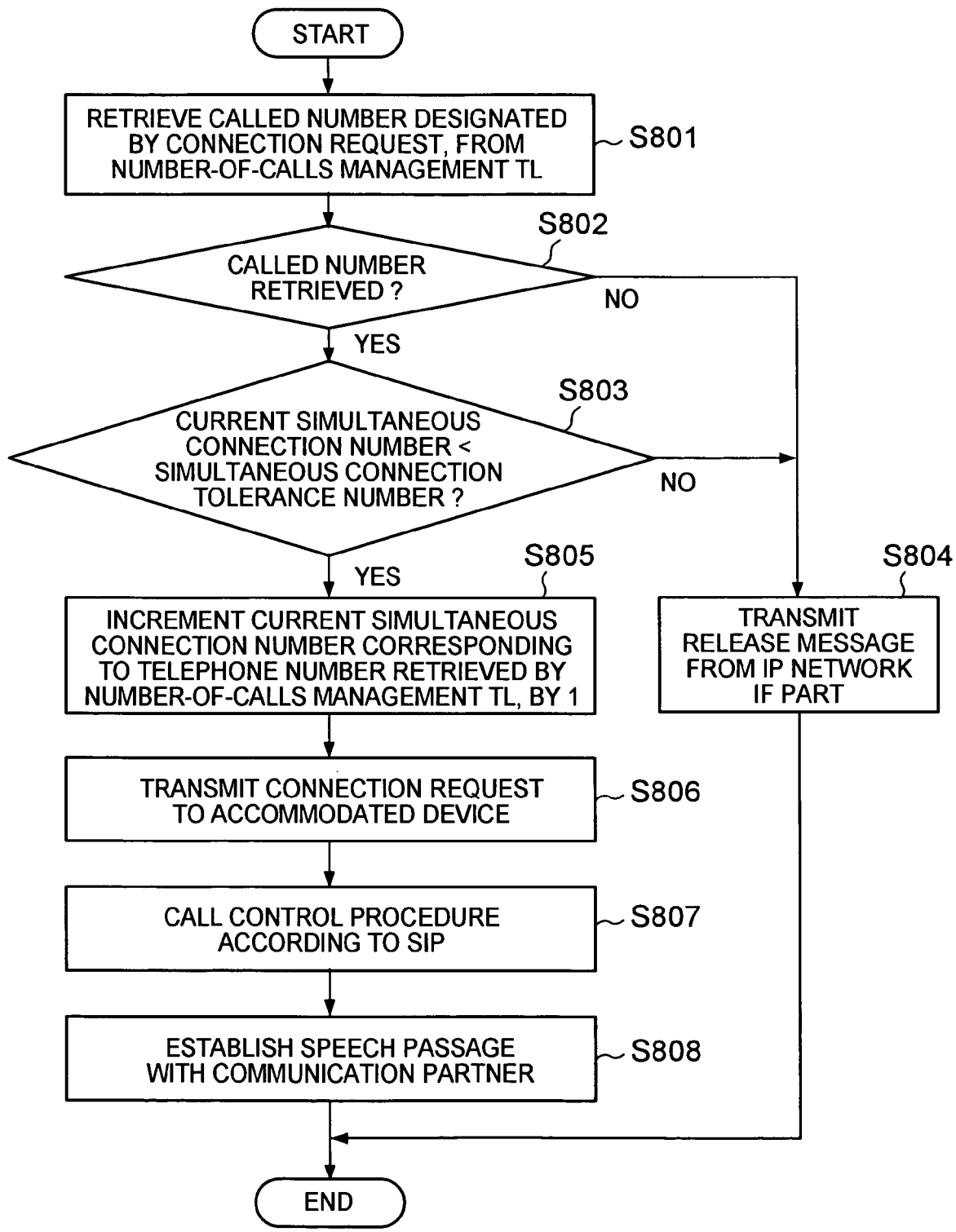
FIG. 9 is a flow chart explaining a call-in controlling operation (S605 of FIG. 7)

FIG. 9 is a flow chart for explaining a call-in controlling operation (S605 of FIG. 7).

At first, the SIP processing unit 104 transmits a connection tolerance request, which is accompanied by the designation of a called number designated with the connection request received from the IP network IF unit 102, to the number-of-calls management unit 105. In response to that request, the number-of-calls management unit 105 retrieves (at S801) the called number designated by that connection permission request, from the number-of-calls management TL 106. If the called number can be retrieved (Yes at S802) it is examined (at S803) whether or not the current simultaneous connection number corresponding to that called number is less than the simultaneous connection allowance number corresponding to that called number.

In cases in which the called number cannot be retrieved (No at S802) from the number-of-calls management TL 107, or in cases in which the current simultaneous connection number corresponding to the called number is not (No at S803) less than the current connection allowance number corresponding to that called number, the number-of-calls management unit 105 notifies the SIP processing unit 104 that the connection is not possible. In response to this, the SIP processing unit 104 creates and transmits (at S804) the SIP packet of the release message through the IP network IF unit 102 to the communication partner that transmitted the SIP packet of the connection request message.

On the other hand, in cases in which the current simultaneous connection number corresponding to the called number is less (Yes at S803) than the simultaneous connection tolerance number corresponding to that called number, the number-of-calls management unit 105 increments by 1 (at S805) the current number of simultaneous connections corresponding to the called number and registered in the number-of-calls management TL 106. Then, the number-of-calls management unit 105 notifies the SIP processing unit 104 of the connection tolerance.

The SIP processing unit 104 transmits (at S806), when it receives notification of connection permission from the number-of-calls management unit 105, the connection request through the line IF unit 101 to the accommodated device. After this, the SIP processing unit 104 performs a call controlling procedure (at S807) according to the SIP, between itself and the communication partner that transmitted the connection request SIP packet, thereby establishing (at S808) a call to the communication partner.

The SIP processing unit 104 then makes a request to the line IF unit 101 for the channel assignment. In response to this request, the line IF unit 101 sets the channel between itself and the accommodated device to be assigned to the call according to the connection request transmitted to the accommodated device, and notifies the SIP processing unit 104 of the set channel. The SIP processing unit 104 notifies the RTP processing unit 103 of the IP address of the communication partner having transmitted the SIP packet of the channel and the connection request notified by the line IF unit 101. In response to this, the RTP processing unit 103 performs the processing specified at the RTP, on the communication signal received from the accommodated device through the channel notified to the line IF unit 101 from the SIP processing unit 104, and on the RTP packet of the communication partner, which is received by the IP network IF unit 102 and having the IP address notified by the SIP processing unit 104. As a result, communication can be made.

Figure 10:
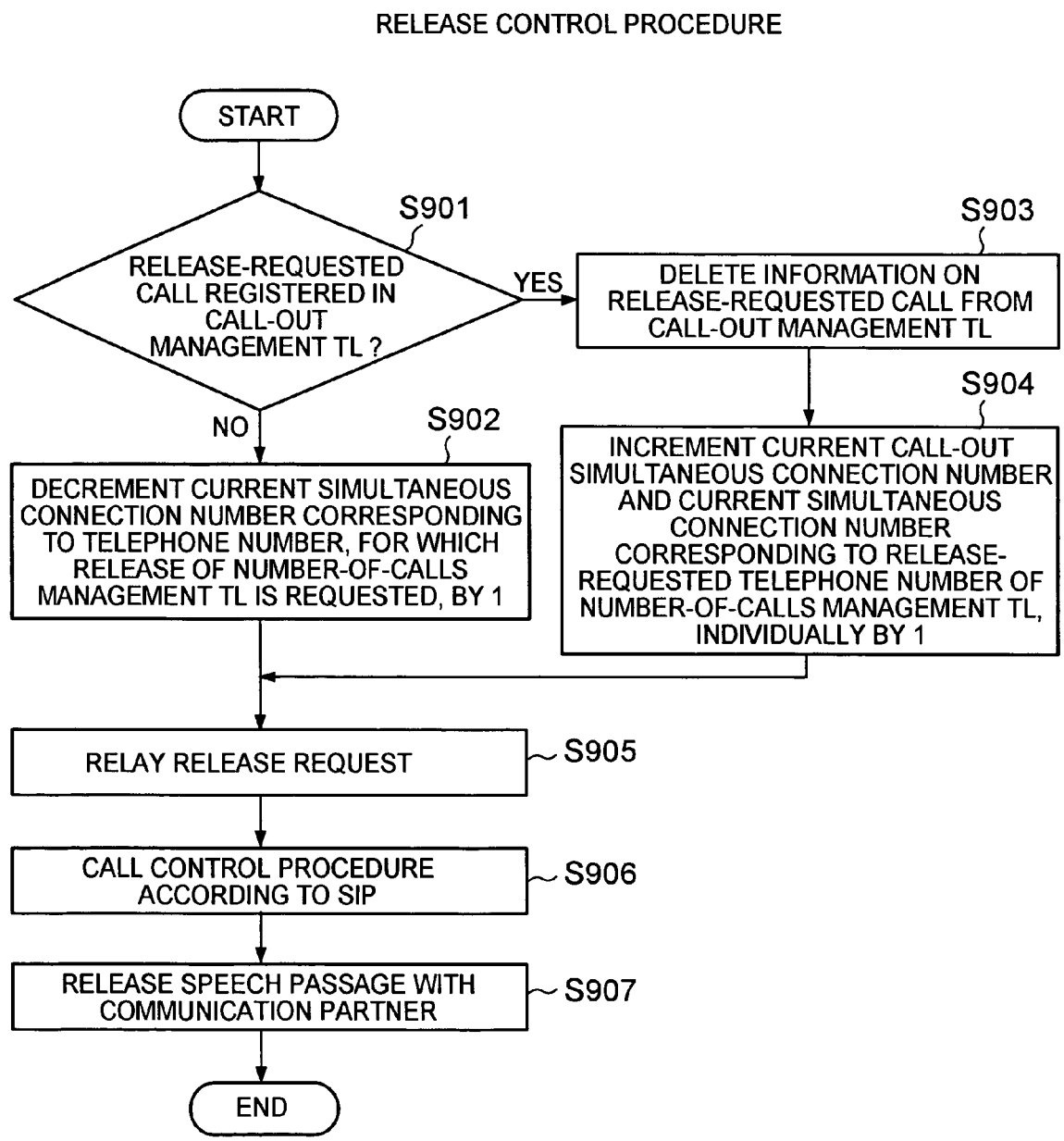
FIG. 10 is a flow chart explaining a release controlling operation (S606 of FIG. 7).

FIG. 10 is a flow chart for explaining a release controlling operation (S606 of FIG. 7).

At first, the SIP processing unit 104 notifies the number-of-calls management unit 105 of the telephone number of its own VoIP gateway apparatus 1 assigned to the release-requested call, the channel assigned to that call by the line IF unit 101, and the IP address of the communication partner by that call, and transmits the management table updating request. In response to this, the number-of-calls management unit 105 examines (at S901) whether or not the records of the telephone number, the channel and the IP address notified by the SIP processing unit 104 are registered in the call-out management TL 108.

In cases in which the records of the telephone number, the channel and the IP address notified by the SIP processing unit 104 are not registered in the call-out management TL 108, the release-requested call is the call established by the connection request from the communication partner. In this case (No at S901), the number-of-calls management unit 105 decrements (at S902) the current simultaneous connection number, which is so registered in the number-of-calls management TL 106 as to correspond to the telephone number notified by the SIP processing unit 104.

On the other hand, in cases in which the records of the telephone number, the channel and the IP address notified by the SIP processing unit 104 are registered in the call-out management TL 108, a release-requested call is the call established by the connection request from the accommodated device. In these cases (Yes at S901), the number-of-calls management unit 105 deletes (at S903) the records of the telephone number, the channel and the IP address notified by the SIP processing unit 104, from the call-out management TL 108. Then, the current simultaneous connection number and the call-out current simultaneous connection number, which are registered in the number-of-calls management TL 106 so as to correspond to the telephone number notified by the SIP processing unit 104, are individually decremented by 1 (at S904).

On the other hand, if the SIP processing unit 104 notifies the number-of-calls management unit 105 of the telephone number of its own VoIP gateway apparatus 1 assigned to the release-requested call, the channel assigned to that call by the line IF unit 101, and the IP address of the communication partner by that call, this release request is relayed (at S905). In short, if the release request is received from the line IF unit 101, the SIP packet of the release request message having the IP address of the communication partner of the release-requested call is created and transmitted from the IP network IF unit 102. If the SIP packet of the release request message is received from the IP network IF unit 102, on the other hand, the release request of the channel assigned to the release-requested call is transmitted from the line IF unit 101.

After this, the SIP processing unit 104 performs (at S906) a procedure for releasing the call according to the SIP, and releases (at S907) the release-requested call. The RTP processing unit 103 stops the processing, which is specified by the communication signal received from the accommodated device through the channel assigned to the release-requested call and by the RTP for the RTP packet of the communication partner of that call received by the IP network IF unit 102. As a result, the communication is ended.

One embodiment of the invention has been heretofore described.

In this embodiment, the VoIP gateway apparatus 1 assigns the telephone number automatically to the call originating from the accommodated device, and sends out the connection request message, using the calling number as that telephone number, to the IP centrex network 5. According to this embodiment, therefore, it is possible to provide the IP centrex service to the accommodated devices (PBX 2 and PSTN 4).

Moreover, the VoIP gateway apparatus 1 manages the number of simultaneous call connections for each telephone number assigned to itself, and denies the connection request of the call when the number of simultaneous call connections in the response, exceeds the preset simultaneous connection allowance number. Thus, it is possible to abide by the number of calls for each telephone number as permitted by the IP centrex service.

Here, the present invention is not be limited to the foregoing embodiment but can be modified in various ways within the scope thereof.

In the foregoing embodiment, for example, an SIP proxy server may also be interposed in the call controlling procedure interchange with the VoIP gateway apparatus 1. Specifically, the VoIP gateway apparatus 1 transmits the SIP packet to the SIP proxy server, which transmits the SIP packet to the VoIP gateway apparatus 1 or the communication partner. In this case, the operation (S707 of FIG. 8) to specify the IP address of the communication partner from the called number designated with the connection request message. Therefore, the VoIP gateway apparatus 1 need not be equipped with the address conversion TL107. In this case, the VoIP gateway apparatus 1 may transmit its own configuration information (i.e., the telephone number and the IP address) at the starting time to the SIP proxy server, and may update the address conversion TL belonging to the SIP proxy server itself, on the basis of the configuration information sent from each VoIP gateway apparatus 1.

Moreover, the foregoing embodiment has been described for cases in which the SIP is used as the call control protocol. However, the invention can also be likewise applied to cases in which the H.323 Standard of the TTC (The Telecommunication Technology Committee) is used in the call controlling procedure.

Moreover, the foregoing embodiment assumes the PBX 2 or PSTN 4 (specifically, the terminal for communications through the PSTN 4) as the accommodated device of the VoIP gateway apparatus 1. However, the VoIP gateway apparatus 1 may also directly accommodate a plurality of voice terminals directly.

In the foregoing embodiment, moreover, the number-of-calls management unit 105 manages the simultaneous call-out connection number and the simultaneous call-in/call-out connection number. However, the invention is not limited thereto. The simultaneous call-out connection number and the simultaneous call-in connection number may also be managed. In call-out cases, moreover, the telephone number, for which the current number of simultaneous call-out connections is less than the call-out simultaneous connection allowance number, may also be assigned to that call. In call-in cases, a response can be made to the call when the number of simultaneous call-in connections number to which a call-in number is assigned is less than the simultaneous call-in connection allowance number. Moreover, the following correction may also be made in cases in which the IP centrex service regulates only the number of simultaneous call connections without distinguishing between call-out and call-in for each telephone number. That is, in call-out cases, a telephone number, for which the current number of simultaneous connections is less than the simultaneous connection allowance number, is assigned. In call-in cases, a response is made to a call to which the call-in number is assigned, when the current number of simultaneous call connections is less than the simultaneous connection allowance number.

The invention claimed is:

1. A VoIP (Voice over IP) gateway apparatus connecting an accommodated device with an IP network, comprising:
    management means for managing the current number of simultaneous call connections using each of at least one telephone number assigned to said VoIP gateway apparatus itself; and
    call control means for selecting, in cases in which a call is received from said accommodated device, among said at least one telephone number, a telephone number for which the current number of simultaneous call connections as managed by said management means is less than a predetermined simultaneous connection allowance number, and for transmitting, to said IP network, a call control message to which the selected telephone number has been given as a calling number.

2. A VoIP gateway apparatus as set forth in claim 1, wherein said call control means transmits, in cases in which the call control message from said IP network is received, the call to said accommodated device in cases in which the current number of simultaneous call connections, as managed by said management means for a telephone number set as a called number in said call control message, is less than the predetermined simultaneous connection allowance number.

3. A VoIP gateway apparatus as set forth in claim 1 or 2, wherein said management means also manages the current number of simultaneous call-out connections that is the current number of simultaneous call connections issued from said accommodated device, using each of at least one telephone number assigned to said VoIP gateway apparatus, and wherein said call control means selects, in cases in which a call is received from said accommodated device, among said at least one telephone number, a telephone number, for which the current number of simultaneous call connections as managed by said management means is less than the predetermined simultaneous connection allowance number, and for which the current number simultaneous call connections is lower than the predetermined call-out simultaneous connection allowance number, and transmits, to said IP network, the call control message to which the selected telephone number has been given as the calling number.

4. A call-in and call-out control method in a VoIP (Voice over IP) gateway apparatus connecting an accommodated device with an IP network, comprising:

the step of managing the current number of simultaneous call connections using each of at least one telephone number assigned to said VoIP gateway apparatus itself; and the step of selecting, in cases in which a call is received from said accommodated device, among said at least one telephone number, a telephone number, for which the current number of the managed simultaneous call connections is less than a predetermined simultaneous connection allowance number, and transmitting, to said IP network, a call control message to which the selected telephone number has been given as a calling number.

* * * * *